3,025,263
EPOXY CARBOXYLIC ACID DIANHYDRIDE
COMPOSITIONS
Henry L. Lee, Jr., 10845 Pangborn Ave., Downey, Calif.,
and Kris O. Neville, 4826 W. 17th St., Los Angeles,
Calif.
No Drawing. Filed July 31, 1957, Ser. No. 675,280
21 Claims. (Cl. 260—47)

This invention relates to novel resinous compositions useful in the manufacture of laminates, castings, adhesives, films, coatings and coated and molded articles. More particularly, the invention embraces compositions comprising carboxylic acid dianhydride-cured epoxy resins, processes for the production of such cured resins, and heat treated products derived therefrom.

The expression "epoxy resin" is employed by the art generically to embrace essentially linear polyethers containing an average of more than one epoxy group per molecule produced by the reaction in an alkaline medium of polyhydroxy alcohols and phenols with epihalohydrin. The degree of linear polymerization of epoxy resins is a function of the relative proportions of the reactants utilized. Epoxy resins are well known, commercially available material, the properties and synthesis of which are described, inter alia, in United States Patents 2,324,-483, 2,444,333, 2,467,171, 2,494,295, 2,500,449, 2,500,-600, 2,511,913, 2,623,023, 2,716,099, 2,744,845 and 2,768,153 and British Patents 518,057 and 579,698, the disclosures of which are incorporated herein by reference and form a part of the description of the epoxy resins useful in the practice of this invention.

In the arts relating to the chemistry of epoxy resins it is convenient to utilize the expression "epoxide equivalent" which is defined as the molecular weight of the epoxy resin in question divided by the average number of epoxide groups present in each molecule. Normally two epoxide groups are present in each epoxy resin molecule.

The epoxy resins primarily available commercially are derived from dihydroxy phenols and epihalohydrins. A significant group of such epoxy resins comprise the reaction products of varying proportions of bis(4-hydroxylphenol) dimethylmethane and epichlorohydrin and are represented by the following generalized formula:

(I) 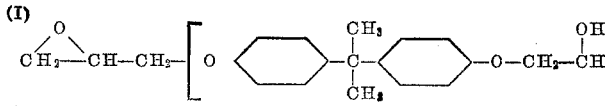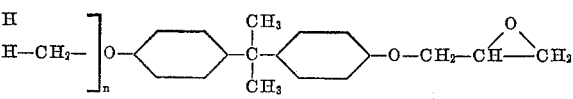

in which $n$ indicates the degree of linear polymerization. Commercial resins of the type generally indicated by Formula I have an average molecular weight in the range of about 350 to about 400 and are composed predominantly of molecules wherein $n=0$, there being included a minor proportion of mixed, high molecular weight polymers. Higher molecular weight polymers in which $n=1$ or more are also commercially available. Characteristic properties of representative commercial epoxy resins of the type represented by the generalized Formula I appear in Table I.

TABLE I

Typical Commercial Epoxy Resins

| Resin designation | Average molecular weight | Epoxide equivalent | Melting Point, °C. |
|---|---|---|---|
| Bakelite ERL-2774 | 350– 400 | 185–200 | Liquid |
| Jones-Dabney Fpi-Rez 515 | 450 | 235–275 | 20–28 |
| Shell Chemical Fpon 815 | 350– 400 | 179–194 | Liquid |
| Shell Chemical Fpon 828 | 350– 400 | 185–200 | Liquid |
| Shell Chemical Fpon 834 | 700 | 300–375 | 40–50 |
| Shell Chemical Fpon 1001 | 900–1,000 | 450–525 | 64–76 |
| Ciba Co., Araldite 6020 | 700 | 300–375 | 40–50 |

Other types of commercially available epoxy resins are derived from the bisphenol of cashew nut oil, from mixtures of dihydric and trihydric bisphenols, and from glycerine. Recently a process has been developed for epoxidizing olefins by reaction with peroxy organic acids such as peroxy acetic acid which will result in a substantial number of new species of epoxy resins of commercial potential.

The conversion of epoxy resins first to a semi-cured intermediate or B-stage and finally to a thermoset resinous material by reaction with cross-linking agents is fully disclosed in the literature including the pertinent patents and is well-known to and practiced by those skilled in the art. Representative cross-linking agents include organic compounds containing at least two reactive points, usually active hydrogen atoms, such as dibasic organic acids or acid anhydrides, polyfunctional primary and secondary aliphatic or aromatic polyamines, bisphenols, dihydric phenols and similar compounds. In the presence of catalytic bases such as potassium hydroxide and certain types of tertiary amines, inorganic acids, boron trifluoride, boron trifluorideamine complexes and equivalent materials are also useful as curing or cross-linking agents for epoxy resins. In general, the art of curing epoxy resins is well defined and is described in the various United States and British patents above listed, the disclosure of which form a part hereof. Epoxy resins of the prior art cured to the B-stage are characteristically brittle, frangible solids.

This invention contemplates an improvement in the art of curing epoxy resins with carboxylic acid anhydride curing agents. Stoichiometrically to effect complete cure one carboxylic acid anhydride group must be provided for each epoxide group of the epoxy resin utilized. In practice, the art has determined that 0.85 of the stoichiometric quantity of carboxylic acid anhydride curing agent is advantageously employed to compensate for complex competing reactions which characterize the curing process. Discussion of the stoichiometric calculations peculiar to the carboxylic acid curing of epoxy resins is presented in the article entitled "Acid Acceleration of Epoxide Condensations," by Dearborn, Fuoss, and White, Journal of Polymer Science 16, 201–208 (1955).

The art in general has considered that carboxylic acid and carboxylic anhydride curing agents should be employed in approximately 0.85 of the theoretical stoichiometric quantity and has endeavored to develop techniques effective to implement that understanding.

It is generally recognized by the prior art that carboxylic acid dianhydride cured epoxy resins demonstrate superior heat distortion temperatures as compared with similar products produced through utilization of other curing agents including carboxylic acid mono-anhydrides, such as phthalic anhydride and maleic anhydride. Moreover, it is known that the heat distortion temperature of dianhydride cured epoxy resins increases as the proportion of dianhydride curing agent approaches the practical stoichiometric quantity. However, the extremely reactive character of the dianhydride curing agents so shortens the pot life and increases the working temperature requisite to insure an appropriate viscosity of the epoxy resin-dianhydride mixture as to foreclose realization of the full potential of the dianhydride curing agents in the production cured epoxy resins of maximum heat distortion temperatures. Carboxylic dianhydrides generally are characterized by limited solubility in epoxy resins unless elevated temperatures are employed and, when mixed with epoxy resins at such elevated temperatures in amounts at or near the practical stoichiometric quantity as suggested by the prior art, gel the resulting mixture almost immediately.

In an effort to realize at least in part the advantages which characterize carboxylic acid dianhydrides as curing agents, the are has resorted to the utilization of mixtures of dianhydrides with mono-anhydrides, such as phthalic anhydride and maleic anhydride. Conventional practice prior to this invention entails the utilization of dianhydride mono-anhydride mixtures in an amount requisite to provide about 0.85 anhydride units per epoxide group of the epoxy resin employed, the relative proportions of mono-anhydride and dianhydride being adjusted normally within the range of from about 30% to not more than about 50% dianhydride the upper limit of 50% being essential to provide a useful pot life.

Table II presents heat distortion and pot life data characteristic of two systems mixed at 120° C. employing the indicated relative proportions of maleic anhydride and pyromellitic dianhydride, the mixtures being utilized in an amount requisite to provide 0.85 anhydride groups per epoxy group present in the epoxy resins utilized. The epoxy resin utilized was Araldite 6020, as described in reference to Table I.

TABLE II

*Effect on Pot Life and Heat Distortion Temperature of Increasing Amounts of Pyromellitic Dianhydride in Combination With Maleic Anhydride*

[Epoxy resin: Epoxide equivalent 220]

| Anhydride present as pyromellitic dianhydride, percent | Pot life at 90° C., min. | Heat distortion temperature after cure, ° C. |
| --- | --- | --- |
| 40 | 56 | 230 |
| 50 | 10 | 260 |

It is apparent from the data appearing in Table II that the utilization of the dianhydride curing agent in proportions forming only 50% of the curing agent mixture reduces pot life to the commercially impractical time period of only ten minutes.

The difficulties attending the utilization in conventional manner and proportion of carboxylic dianhydrides as epoxy resin curing agents has led the art to attempt to utilize the dianhydrides in the form of a solution in a solvent such as acetone. When a carboxylic acid dianhydride is employed in conjunction with a solvent, a rather extensive procedure is required to achieve the desired solution. Several hours at reflux temperatures are necessary, and the ultimate epoxy resin-dianhydride-solvent mixture, although useful in the production of laminates, and the like, has a short shelf life and the ultimate properties of the cured system are degraded by the presence of entrapped volatiles. Such solvent systems, furthermore, cannot be employed for the manufacture of cast or molded articles since, in the fabrication of such articles, it is not possible adequately to remove the solvents from the plastic mass prior to curing.

It is accordingly a primary object of this invention to provide a novel carboxylic acid dianhydride cured epoxy resin characterized by superior heat distortion temperatures.

It is a further primary object of the invention to provide a flexible intermediate or B-stage carboxylic acid dianhydride cured epoxy resin composition which is stable in storage and which is convertible to a hard thermoset product.

It is a further object of the invention to provide an epoxy resin carboxylic acid dianhydride system suitable for use in the production of molded products, laminated structures, coated fabrics and the like, which is characterized by a long pot life and a comparatively low pot temperature.

It is yet another object of the invention to provide a pyromellitic dianhydride cured epoxy resin composition in which pyromellitic dianhydride is the sole essential curing agent.

It is yet another object of the invention to provide a process for the production of novel carboxylic acid dianhydride cured epoxy resin compositions.

It is an additional object of the invention to provide flexible B-stage pyromellitic dianhydride cured epoxy resin compositions which are stable in storage under moderate refrigeration.

It is yet another object of the invention to provide laminated structures such as electrical coils which are bonded together by a web of cloth, paper or the like impregnated with the novel carboxylic acid dianhydride cured epoxy resin compositions of this invention.

Now in accordance with this invention there is provided a novel composition comprising an epoxy resin, and a dianhydride of an aromatic tetracarboxylic acid, said dianhydride being present in an amount requisite to provide from about 0.3 to about 0.6 anhydride equivalents for each equivalent of epoxide in said epoxy resin, available for reaction with said dianhydride.

The novel compositions to which this invention generally relate, when liquid epoxy resins are employed, may be formulated by the addition of comminuted or finely powdered dianhydride at room temperature with suitable agitation, ball mill grinding, or the like, requisite to effect complete dispersion. Such mixtures are stable for substantial periods of time, for example, 10 days or more. Should any progressive increase in viscosity occur, it may be obviated by heat immediately prior to utilization. Lower viscosities may be achieved through utilization of elevated temperatures at the expense of pot life. The requirement of mechanical agitation requisite to effect dispersion of the anhydride in the liquid epoxy resin may be eliminated by the solution of the anhydride in the epoxy resin through use of elevated temperatures to produce compositions characterized by commercially practical pot life, for example, a pot life in excess of about 30 minutes at 120° C. Anti-settling agents, such as finely divided talc or having a pH of from about 7 to about 9 can be employed. Hot mixing procedures or solvent vehicles are appropriately utilized by techniques known in the industry when room temperature solid epoxy resins are cured in accordance with the invention.

It has been determined that the dispersed epoxy resin-dianhydride systems of the invention are characterized by a cure rate which is slow, steady, and reproducible. Such systems, in curing, proceed from a viscous liquid to a tack-free flexible B-stage product and ultimately to a cured thermoset resinous material. The flexible B-stage product is a particularly useful material in that it is easy to handle, softens rapidly at 350° F. and thereafter hardens in a short period of time, normally in from about 2½ to about 5 minutes. Such flexible B-stage product more nearly approximates a "molding compound," as such compounds are known to the industry, than any epoxy resin product previously known and is ideal for the manufacture of insulated coils. Conventional insulation which is formulated from a plurality of layers of varnish-bonded insulation materials, such as mica, can be delaminated or cut apart fairly easily. The B-stage products of this invention when coated on glass cloth, wrapped in conventional manner provide an insulated coil, hot pressed at 350° F. for a time period from about 2 to about 10 minutes, preferably for about 5 minutes and postcured in conventional manner cannot be delaminated or cut open by means of a knife or scalpel.

The epoxy resin-aromatic carboxylic acid dianhydride systems which are generically contemplated by the invention are of unexpected and particular commercial significance in providing a 100% solids B-stage condensation product, which is flexible and which is not attended by the frangible and brittle characteristics which have in the past characterized 100% solids epoxy resin B-stage compositions. Moreover, the flexible B-stage epoxy resin compositions formed in accordance with the invention are stable under moderate refrigeration for substantial periods of time, frequency as much as about 3 months. The flexible characteristic of the B-stage epoxy resin compositions produced in accordance with the invention is attended by significant practical advantages. The frangible, brittle B-stage epoxy resin compositions of the prior art, when applied as coatings to fabrics or tapes, provide a coated material which, when wrapped over a sharp corner, flake off to form resin-starved areas, disadvantageously characterized by low dielectric strength upon curing. The application of the flexible B-stage composition of this invention to tapes and the like permits the production of cured laminated or wrapped structures formed with such coated tapes which are characterized by remarkably high heat distortion temperatures, and which demonstrate no resin loss by flaking and hence no consequent reduction in dielectric strength.

The following theoretical explanation, while not in limitation of the invention, is advanced as a possible explanation of the results achieved.

It is theoretically considered that a stoichiometric relationship not heretofore appreciated has been discovered pursuant to which utilization of dianhydride curing agents in approximately 50% of the stoichiometric value previously accepted gives rise to the novel compositions and results which characterize the invention.

The carboxylic hydroxyl formed by the reaction of the anhydride structure with a hydroxyl present in the epoxy resin material (II)

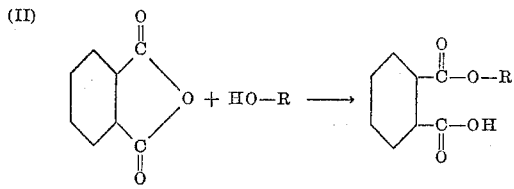

is not only capable of reaction with an epoxy group, as assumed from the stoichiometric calculation, based on the equation (III)

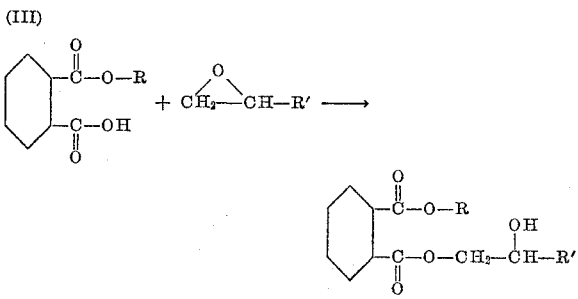

but is also capable of catalyzing, or further effecting, a reaction between epoxy groups present in the mix such that either linkages are formed in the cured resin. If the formation of ether linkages proceeds at a rate approximately equal to the formation of ester linkages, it will be seen that complete cure can be effected with an anhydride to epoxide equivalent ratio of 0.5 to 1. Experimental evidence with dianhydride cures indicates that this theoretical value is approximately true but that it should further be multiplied by the arbitrary constant 0.85 to account for other competing reactions known or believed to be present during anhydride cure, such that, advantageously with a dianhydride, when used without a monoanhydride or solvent as a curing agent for epoxy resins, the anhydride-epoxide equivalent ratio is substantially 0.425/1. Succinctly stated, this invention contemplates epoxy resin-dianhydride systems in which the anhydride is present in approximately one-half the effective stoichiometric proportion of 0.85 equivalents per epoxide equivalent. It will be recognized that this value is not precise, and that compositions of matter containing amounts substantially near this value, within the range of from about 0.3 to about 0.6 equivalents of dianhydride per epoxide equivalent, are embraced within the scope of the invention.

It is hypothesized that the unique and unusual flexible thermoplastic B-stage are attributable to the early formation of long linear polymers prior to cross-linking. The formation of such long linear polymers is a consequence of the differences in reactivity between the first and second reacting carboxyl group of an anhydride. Thus, whereas the first reaction, that of opening of the anhydride ring is relatively fast, those reactions involving the second carboxyl group and the etherification mechanism are comparatively slower and cannot proceed until the anhydride structure has been opened. Hence, by stopping the reaction, e.g., by freezing, just as the first carboxyl group has reacted, it is considered that there is formed a structure corresponding to the generalized formula (IV)

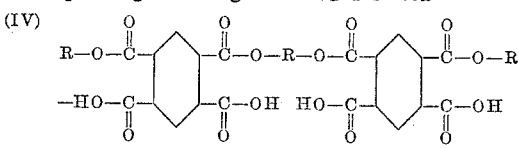

where R is the epoxy resin chain such that linear polymers exist. The unreacted carboxyls and the unreacted epoxy groups are still available to cross link the polymer upon application of heat.

This B-stage reaction mechanism is reproducible and follows the theoretical principles laid down by Arrhenius with regard to the temperature dependence of chemical reactions, i.e., every 10° C. rise in temperature reduces the reaction time by a factor of one-half. Table III shows some typical B-stage times compared with theory.

TABLE III

*Temperature Dependence of Epoxy Resin-Dianhydride Flexible B-Stage Phenomenon, Based on ERL 3794*

[Pyromellitic dianhydride: 25 phr. (A/E=0.425/1), talc, pH 8.4: 100 phr.]

| Temperature, °C. | Time to tack-free, flexible B-stage, min. | |
|---|---|---|
| | Experimental | Predicted from Arrhenius equation |
| 21 | 2,800 | ---------- |
| 75 | 200 | 150 |
| 125 | 10 | 10 |
| 145 | 6 | 5 |

If desired, use may be made of organic or inorganic fillers and anti-settling agents, resinous modifiers, diluents, and amine or other cure accelerators, without changing the composition of matter within the meaning of this invention. Fillers such as talc characterized by a pH of from about 7 to about 9 are effective to enhance the solubility and reactivity of the dianhydride, possibly by reason of catalytic effects similar to those described in U.S. Patent 2,637,715.

Regardless of the technical accuracy of the theoretical explanation of the results achieved, the invention entails the utilization as the sole curing agents essential to the production of flexible B-stage epoxy resins and fully cured epoxy resins of high heat distortion temperatures of aromatic carboxylic dianhydride curing agents in specific critical amounts less than the stoichiometric amount based on the epoxy groups present in the epoxy resin utilized and more specifically contemplates utilization of from about 0.3 to about 0.6 equivalent of dianhydride curing agent per epoxide equivalent in the epoxide resin available for reaction. Preferably there is utilized from about 0.4 to about 0.5 equivalent of dianhydride curing agent per epoxide equivalent with theoretical optimum results being achieved through utilization of 0.425 anhydride equivalents per epoxide equivalent.

The upper limit of about 0.6 equivalents of dianhydride curing agent per epoxy equivalent of the epoxy resin utilized is essential to the production of a formulation characterized to a satisfactory pot life and viscosity characteristics. Increase in the proportion of dianhydride curing agent substantially in excess of 0.6 correspondingly shortens pot life and increases viscosity with highly unsatisfactory results. For example, in many formulations, it is necessary to work with the mixture of epoxy resin and curing agent while in a "hot melt" state while concurrently providing a low viscosity. The temperatures requisite to a satisfactory viscosity frequently are in the range of 200 to 250° F. with the result that pot life is unduly shortened. In those prior art practices wherein it is necessary to incorporate substantial loading volumes of fillers require that the initial epoxy resin-curing agent be of lowest practical viscosity. Moreover, increase in the proportion of dianhydride curing agent increases the settling rate of the solid components of the system and presents a control problem of serious proportion. Substantial increase in the critical proportion of dianhydride curing agent which characterizes this invention complicates the utilization of the epoxy resin curing agent formulation and in large measure defeats the advantages of the invention. Utilizing the dianhydride curing agents of the invention in proportions of 0.85 equivalents thereof per equivalent of epoxy group available for the reaction, as taught by analogy to the prior art, is impractical. Such a mixture, if worked hot, gels before stirring can be effected. If an effort is made to disperse dianhydride curing agents in epoxy resins in such concentration, pot life is commercially impractical, excessive settling occurs resulting in the production of castings of uneven quality, and the viscosity even if at the permitted working temperatures are impractically high. The lower value of about 0.3 equivalents of the anhydride curing agent per epoxy group available for reaction is essential to the production of the satisfactory cure.

The utilization of additional curing agents of a type known to the prior art, in limited or minor proportions, is not foreclosed except as hereinafter specified. In any event, however, it is essential that the aromatic carboxylic acid dianhydride curing agent, which is essential to the invention, be utilized in the defined critical proportions.

Should it be desired to utilize the dianhydride curing agents of the invention in combination with additional curing agents, it is expedient to blend the dianhydride with the additional curing agent in the manner well known to those skilled in the art. It will be appreciated that the purpose of such secondary curing agents is to modify the properties of the composition such that the resultant product may have more advantageous properties for specific applications and particularly that the proportion of dianhydride curing agent employed will be maintained within the defined critical amount based upon the number of epoxide groups in the epoxy resins which are not reacted with the second curing agent.

For example, should it be desirable to employ a carboxylic-acid-terminated polyester (i.e., such as the reaction product of 5 mols of adipic acid with 4 mols of glycerol) as a modifier to impart impact resistance or flexibility into the cured system, calculations of the amount of dianhydride required would disregard the ethoxyline groups absorbed during reaction with the polyester. Similarly, should it be desirable to employ chlorendic anhydride to improve flame resistance, or a liquid anhydride such as dodecenyl succinic anhydride or the methylated derivative of 3,6 endomethylene 1,2,3,6 tetrahydro cis-phthalic anhydride, or a polyamine, such as metaphenylenediamine, to improve handling or other characteristics, or to improve or modify the cured properties, calculations of the amount of dianhydride required would disregard the ethoxyline groups absorbed during reaction with these materials.

In no event, however, is any carboxylic acid anhydride curing agent other than the aromatic dianhydrides to which this invention relates employed in an amount greater than that requisite to provide 0.2 anhydride equivalents per epoxide equivalent of the epoxy resin utilized to foreclose adverse affect on the heat distortion temperatures of the cured epoxy resin products contemplated by the invention.

The invention contemplates generically epoxy resins including those disclosed in the various patent references herein identified, which contain an average of more than 1, preferably at least about two, epoxide groups per molecule.

Epoxy resins characterized by a low degree of polymerization and a high epoxide content are most effective in solubilizing dispersed solid dianhydride curing agents such as pyromellitic dianhydride, and constitute the most appropriate starting materials for most applications. Preferred starting materials comprise reaction products of bisphenols such as bis(4-hydroxylphenyl) dimethylmethane with an epihalohydrin such as are presented by the generic Formula I. It will be appreciated that epoxy resins employed will contain at least some molecules which contain hydroxyl groups along the polymer chain. When utilizing epoxy resins which contain no hydroxyl groups in the practice of the invention, it is appropriate to include a small amount of water or similar compound effective to open the anhydride ring of the dianhydride catalyst, such material, however, being employed in limited amount not in excess of that required to open more than about 10% of the anhydride groups.

The aromatic carboxylic acid dianhydride curing agents embraced by the present invention may contain a single or multiple ring nucleus. Additionally, the aromatic nucleus may be substituted with, for example, an alkyl group or the like. While the anhydride structures may be affixed to the same or different rings, it is preferred that the anhydride structures be affixed to the same aromatic nucleus. Pyromellitic dianhydride is preferred for the practice of the present invention. Mellophanic dianhydride and naphthalene-1,2,3,4-tetracarboxylic dianhydride are typical examples of additional aromatic dianhydrides which appropriately may be employed. The invention, however, is not limited to the enumerated dianhydrides but embraces aromatic carboxylic acid dianhydrides generally, the essential characteristic of which is the dianhydride groupings, rather than the aromatic nucleus to which the anhydride groups are bonded.

In the following examples the term A/E is used to indicate the ratio of anhydride equivalents of the aromatic dianhydride curing agent to epoxy equivalents of the epoxy polymer. The term phr. is employed to indicate weight parts per 100 weight parts of resin starting material. Heat distortion temperatures were determined following the procedure outlined by ASTM D-648-45T, 264 p.s.i. fiber stress.

EXAMPLE I

Bis(4-hydroxylphenyl) dimethylmethane was reacted with epichlorohydrin in an alkaline solution to produce a liquid epoxy polymer (Bakelite ERL-2774) having an average molecular weight of from 350 to 400 and an epoxide equivalent of 185–200. Thirty phr. of pyromellitic dianhydride was added to the epoxy polymer to give an A/E ratio of about 0.55 and the mixture was stirred thoroughly by mechanical agitation for a period of 30 minutes at room temperature. The partially cured polymer so formed was then cast into a bar and cured 24 hours at 220° F. The bar demonstrated a heat distortion temperature of 290° F.

EXAMPLE II

Epon 1001, a solid epoxy resin product of the Shell

Chemical Company described in Table I, was heated to 80° C. and 9 phr. of pyromellitic dianhydride was added to give an A/E ratio of about 0.41. A thoroughly cured sample plaque demonstrated a Barcol hardness of 10–20 at room temperature.

EXAMPLE III

Epi-Rez 515, a solid epoxy polymer product of the Jones-Dabney Company described in Table I, was heated to 70° C. and 21 phr. of pyromellitic dianhydride were admixed therewith to provide an A/E ratio of 0.48. Cured plaques demonstrated a Barcol hardness of 45 at room temperature.

EXAMPLE IV

A liquid epoxy resin, Bakelite ERL 3794, understood to be a mixture of the triglycidyl ether of a phenol resorcinol formaldehyde reaction product and the diglycidyl ether of bis(4-hydroxylphenyl) dimethylmethane having an average molecular weight of 350–400, an epoxide equivalent of 170–182 and containing about 2.2 epoxy groups per molecule was mixed with one hundred phr. of talc having a pH of 8.4. The resin-talc mixture was heated to 70° F. and 25 phr. of pyromellitic dianhydride was added while the mixture was stirred. The blend had an A/E ratio of about 0.4. Plaques and bars were then cast and cured for 8 hours at 350–400° F. The plaques exhibited a Barcol hardness of 55–60 at room temperature and a Barcol hardness of 1 at 600° F. The heat distortion temperature of the bars was 317° C.

EXAMPLE V

Glycerol was reacted with epichlorohydrin to yield a liquid epoxy resin (Shell Chemical Epon 562) which was characterized by an average molecular weight of 300 and an epoxide equivalent of 140–165. One hundred phr. of finely divided calcium carbonate and 30 phr. of pyromellitic dianhydride were added to the epoxy polymer for an A/E ratio of about 0.41. A thoroughly cured sample closely resembled a semi-plasticized epoxy compound and demonstrated no Barcol hardness.

EXAMPLE VI

The epoxy resin of Example I was admixed with 30 phr. of pyromellitic dianhydride (A/E=.55) and to this mixture was added 3% by weight of tridimethyl amino methyl phenol. A fully cured sample demonstrated a Barcol hardness of 40 at room temperature.

EXAMPLE VII 12.5 phr. of pyromellitic dianhydride and 9 phr. of metaphenylene diamine/4,4' methylene dianiline were blended with the epoxy resin of Example IV. Cured samples demonstrated a room temperature Barcol hardness of 20–40.

EXAMPLE VIII

In order to demonstrate the properties of the B-stage product of the invention, the intermediate product of Example I was applied to a glass cloth and was stored for 3 days at room temperature. At the end of the 3 days, the epoxy mixture had cured to a tack-free, extremely flexible B-stage which could be bent to 90° without cracking. Plies of the treated glass cloth were stacked and cured in a press under a pressure of approximately 40 p.s.i. for 20 minutes at about 400° F. The resin mixture exhibited excellent flow and thoroughly wetted the laminate. The treated laminate was suitable for handling for post cure. The laminate demonstrated a coefficient of thermal expansion of $19 \times 10^{-6}$ in./in./° C. compared to $17 \times 10^{-6}$ in./in./° C. for copper.

EXAMPLE IX

The intermediate product of Example IV was applied to a glass tape. At room temperature two days of aging were required to achieve a tack-free B-stage product. Additional samples were cured to a B-stage product by heating at 250° F. for 10 minutes. Samples of each of the above semi-cured tapes were placed in the deep freeze compartment of a commercial refrigerator for 3 months. Upon return to ambient temperature the tapes exhibited excellent flexibility and could be laminated over sharp corners. The B-stage resin demonstrated excellent flow characteristics under heat and pressure.

EXAMPLE X

A solution containing about 60% solids of the epoxy resin of Example II in a 1/1/1 mixture by volume of toluene, methyl ethyl ketone and n-butyl alcohol was blended with about 6.3 phr. of pyromellitic anhydride at room temperature (A/E ratio of about 0.3). The mixture was applied to tapes and a B-stage composition was obtained after storage for three days at room temperature. The B-stage composition demonstrated excellent flexibility and, upon application of heat, demonstrated excellent flow characteristics.

EXAMPLE XI

The admixture of Example X was cast and, after being fully cured, was exposed to a temperature of 500° F. The sample did not burn, carbonize or flow.

EXAMPLE XII

In this example, the heat distortion properties of a cured epoxy resin of the present invention was compared to the heat distortion properties of the same epoxy resin cured with other curing agents known to the art. In each case, the epoxy resin starting material was the liquid reaction product of bisphenol A and epichlorohydrin having an average molecular weight of 350–400 and an epoxy equivalent of 185–200 (Shell Chemical Epon 828).

TABLE IV

*Heat Distortion Temperature Ranges for Typical Curing Agents*

| Curing agent: | Range of heat distortion temperature, ° C. |
|---|---|
| Diethylenetriamine | 80–125 |
| Metaphenylenediamine | 130–160 |
| Phthalic anhydride | 100–125 |
| Chlorendic anhydride | 180–200 |
| Pyromellitic dianhydride, A/E=0.425/1 | 290–300 |

What is claimed is:

1. A composition of matter consisting essentially of (1) a 1,2-epoxy resin containing an average of more than one epoxy group per resin molecule, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

2. The composition of claim 1 wherein said curing agent is present in an amount requisite to provide from about 0.4 to about 0.5 anhydride equivalents per epoxide equivalent of said epoxy resin available for reaction therewith.

3. The composition of claim 1 wherein said epoxy resin is a polyether of bis(4-hydroxylphenyl) dimethylmethane and an epihalohydrin.

4. The composition of claim 3 wherein said epoxy resin has a molecular weight of from about 350 to about 400.

5. The composition of claim 1 wherein said epoxy resin is a liquid and wherein said dianhydride is a solid, said dianhydride being dispersed in particulate form in said liquid epoxy resin.

6. The composition of claim 5 wherein said epoxy resin is a polyether of bis(4-hydroxylphenyl) dimethylmethane and an epihalohydrin.

7. The composition of claim 5 wherein said curing agent is present in an amount requisite to provide from about 0.4 to about 0.5 anhydride equivalents per epoxide equivalent of said epoxy resin available for reaction therewith.

8. A flexible epoxy resin composition in an intermediate stage of cure produced by reacting a mixture consisting essentially of (1) a 1,2-epoxy resin containing an average of more than one epoxy group per resin molecule, (2) an epoxy resin curing agent consisting essentially of pyromellitic acid dianhydride, said curing agent being utilized in an amount requisite to provide from about 0.3 to about 0.6 anhydride equivalents of said epoxy resin available for reaction with said curing agent, and (3) a finely divided inorganic filler consisting of talc characterized by a pH of from about 7 to about 9.

9. The epoxy resin composition of claim 8 wherein said dianhydride curing agent is utilized in an amount requisite to provide from about 0.4 to about 0.5 anhydride equivalents per epoxide equivalent of said epoxy resin.

10. A web coated with the epoxy resin composition of claim 5.

11. A fiber glass tape coated with the epoxy resin composition of claim 8.

12. A composition of matter produced by heating a mixture consisting essentially of (1) a 1,2-epoxy resin containing an average of more than one epoxy group per resin molecule, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

13. A laminated structure comprising a plurality of webs coated with a cured resinous composition formed by heating a mixture consisting essentially of (1) a 1,2-epoxy resin containing an average of more than one epoxy group per resin molecule, (2) an epoxy resin curing agent consisting essentially of pyromellitic dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

14. A laminated structure in which the binder joining the laminae consists essentially of a resin composition produced by heating (1) a 1,2-epoxy resin containing an average of more than one epoxy group per resin molecule group, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

15. A laminated structure as defined in claim 14 wherein the laminae comprise glass cloth.

16. An insulated coil in which at least a part of the insulation comprises a laminate of the insulating material, the binder joining the laminae of said laminate being produced by heating a mixture consisting essentially of (1) a 1,2-epoxy resin containing an average of more than one epoxy group per resin molecule, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

17. An insulated coil as defined in claim 16 wherein the laminae of said laminate comprises glass cloth.

18. A tape bearing on at least one surface thereof a composition of matter consisting essentially of (1) a 1,2-epoxy resin containing an average of more than one epoxy group per resin molecule, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

19. A tape comprising a web of glass cloth bearing on at least one surface thereof a composition of matter consisting essentially of (1) a 1,2-epoxy resin containing an average of more than one epoxy group per resin molecule, (2) an epoxy resin curing agent consisting essentially of pyromellitic acid dianhydride, said curing agent being present in an amount requisite to provide from about 0.3 to about 0.6 anhydride equivalents per epoxide equivalent of said epoxy resin available for reaction with said curing agent, and (3) a finely divided inorganic filler consisting of talc characterized by a pH of from about 7 to about 9.

20. A composition of matter as defined in claim 1 wherein the inorganic filler is talc having a pH of about 8.4.

21. A laminated structure as defined in claim 14 wherein the inorganic filler is talc having a pH of about 8.4.

References Cited in the file of this patent

UNITED STATES PATENTS

| 2,768,153 | Shokal | Oct. 23, 1956 |
| 2,773,043 | Zukas | Dec. 4, 1956 |
| 2,948,705 | Robinson | Aug. 9, 1960 |

OTHER REFERENCES

Dearborn et al.: Journal of Poly. Sci., vol. 16, pp. 201–208 (April 1955).

Du Pont Technical Information Bulletin, "PMDA-Pyromellitic Dianhydride—A Curing Agent for Epoxy Resins," November 1955.

Du Pont Technical Information Bulletin Supplement No. 2. "Pyromellitic Dianhydride—PMDA—A Curing Agent for Epoxy Resins," August 1956.

Modern Plastics, vol. 32, No. 1, September 1954, pages 155–161 and pages 240–243.

Shell Chem. Corp. Technical Bulletin SC: 57–16 (April 1957), pages 1–7.